United States Patent
Vandikas et al.

(10) Patent No.: US 10,404,856 B2
(45) Date of Patent: Sep. 3, 2019

(54) METHOD AND CALL MANAGER NODE FOR HANDLING GROUP CALLS

(71) Applicant: Telefonaktiebolaget LM Ericsson (publ), Stockholm (SE)

(72) Inventors: Konstantinos Vandikas, Solna (SE); Vlasios Tsiatsis, Solna (SE); Keven Wang, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 116 days.

(21) Appl. No.: 15/516,590

(22) PCT Filed: Oct. 8, 2014

(86) PCT No.: PCT/SE2014/051188
§ 371 (c)(1),
(2) Date: Apr. 3, 2017

(87) PCT Pub. No.: WO2016/056962
PCT Pub. Date: Apr. 14, 2016

(65) Prior Publication Data
US 2018/0270351 A1    Sep. 20, 2018

(51) Int. Cl.
*H04M 3/46* (2006.01)
*H04M 3/42* (2006.01)
*H04M 3/436* (2006.01)

(52) U.S. Cl.
CPC ....... *H04M 3/465* (2013.01); *H04M 3/42008* (2013.01); *H04M 3/42144* (2013.01);
(Continued)

(58) Field of Classification Search
CPC ......... H04M 1/72577; H04M 2250/10; H04M 1/72513; H04M 1/72572;
(Continued)

(56) References Cited

U.S. PATENT DOCUMENTS

2005/0089154 A1    4/2005    Akhteruzzaman
2008/0055395 A1    5/2008    Mock
(Continued)

FOREIGN PATENT DOCUMENTS

EP    1 383 299 A1    1/2004
EP    1383299 A1 *  1/2004
(Continued)

OTHER PUBLICATIONS

International Search Report and Written Opinion issued in International Application No. PCT/SE2014/051188, dated Jun. 11, 2015, 11 pages.

*Primary Examiner* — Nafiz E Hoque
(74) *Attorney, Agent, or Firm* — Rothwell, Figg, Ernst & Manbeck, P.C.

(57) ABSTRACT

A method and a call manager node (200) for handling calls directed to a group of subscribers. When receiving (2:3) a request from a caller (202) for access to a first group of subscribers (204) having at least one common characteristic, the call manager node assigns (2:4) first caller-specific temporary group number (A1) for the caller, wherein the first group number can be used exclusively by the caller for calling the subscribers in the first group. The call manager node further sends (2:5) the first group number to the caller in response to the request. The caller is then connected (2:7, 2:9, 2:11) to a subscriber in the first group sequentially or according to a scheme each time the caller dials (2:6, 2:8, 2:10) the first group number. The group is created according to a criteria and the anonymity of the called parties is kept. Call hunting.

24 Claims, 6 Drawing Sheets

(52) U.S. Cl.
CPC ............. *H04M 3/436* (2013.01); *H04M 3/46* (2013.01); *H04M 3/42102* (2013.01); *H04M 2203/152* (2013.01); *H04M 2203/2044* (2013.01); *H04M 2242/18* (2013.01)

(58) Field of Classification Search
CPC ..... H04M 2203/1016; H04M 2207/18; H04M 2242/14; H04M 2242/30; H04M 3/42; H04M 3/53333; H04M 3/54; H04M 3/56; H04M 3/568; H04M 7/006; H04M 2250/12; H04M 2250/52
See application file for complete search history.

(56) References Cited

U.S. PATENT DOCUMENTS

| | | | |
|---|---|---|---|
| 2013/0070912 A1* | 3/2013 | Parandekar | H04M 3/465 379/88.05 |
| 2014/0115486 A1* | 4/2014 | Benson | G06Q 10/06 715/739 |

FOREIGN PATENT DOCUMENTS

| | | |
|---|---|---|
| EP | 2 104 324 A2 | 9/2009 |
| JP | 2007221592 A | 8/2007 |

* cited by examiner

METHOD AND CALL MANAGER NODE FOR HANDLING GROUP CALLS

CROSS REFERENCE TO RELATED APPLICATION(S)

This application is a 35 U.S.C. § 371 National Stage of International Patent Application No. PCT/SE2014/051188, filed Oct. 8, 2014, designating the United States, the disclosure of which is incorporated by reference.

TECHNICAL FIELD

The present disclosure relates generally to a method and a call manager node for handling calls directed to multiple subscribers, where a group of subscribers are accessible by means of a common group number.

BACKGROUND

In the field of telecommunication, a service may be employed for providing access to multiple subscribers by means of a single telephone number. This service is useful when a calling party wishes to access a certain group of subscribers with certain characteristics in common, without having to look up and dial the phone number of every subscriber. Instead, a "virtual" phone number representing the group can be conveniently used such that whenever a person dials the virtual phone number on his/her communication device, hereafter referred to as a "caller" for short, the subscribers will be called "iteratively", i.e. one by one according to a calling list or the like. For example, a sales person may wish to call potential customers living within a certain area for offering services or products which may be deemed particularly attractive for specific customers. However, the current technique is not capable of protecting privacy and integrity in a satisfactory way.

SUMMARY

It is an object of embodiments described herein to address at least some of the problems and issues outlined above. It is possible to achieve this object and others by using a method and a call manager node as defined in the attached independent claims.

According to one aspect, a method is performed by a call manager node for handling calls directed to multiple subscribers. In this method, the call manager node receives a request from a caller for access to a first group of subscribers having at least one common characteristic. Then the call manager node assigns a first caller-specific group number for the caller, wherein the first group number can be used exclusively by the caller for calling the subscribers in the first group, and sends the first group number to the caller in response to the request. The call manager node further connects the caller to a subscriber in the first group iteratively each time the caller dials the first group number.

Thereby, the first caller-specific group number cannot be used by any other party than the caller that is authorized to use it by the above assigning, which provides increased security. Further, the individual numbers of the subscribers in the first group of subscribers are not exposed to the caller in this process which provides increased integrity. It is also possible to set any rules or restrictions to control the caller's usage of the first caller-specific group number, e.g. according to preferences of the individual subscribers in the first group.

According to another aspect, a call manager node is arranged to handle calls directed to a group of subscribers. The call manager node comprises means, e.g. a receiving module, configured to receive a request from a caller for access to a first group of subscribers having at least one common characteristic, and means, e.g. an assigning module, configured to assign a first caller-specific group number for the caller, wherein the first group number can be used exclusively by the caller for calling the subscribers in the first group. The call manager node also comprises means, e.g. a sending module, configured to send the first group number to the caller in response to the request, and means, e.g. a call setup module, configured to connect the caller to a subscriber in the first group iteratively each time the caller dials the first group number.

The above method and call manager node may be configured and implemented according to different optional embodiments to accomplish further features and benefits, to be described below.

A computer program is also provided comprising instructions which, when executed on at least one processor, cause the at least one processor to carry out the above method. A carrier is also provided which contains the above computer program, wherein the carrier is one of an electronic signal, optical signal, radio signal, or a non-tangible computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
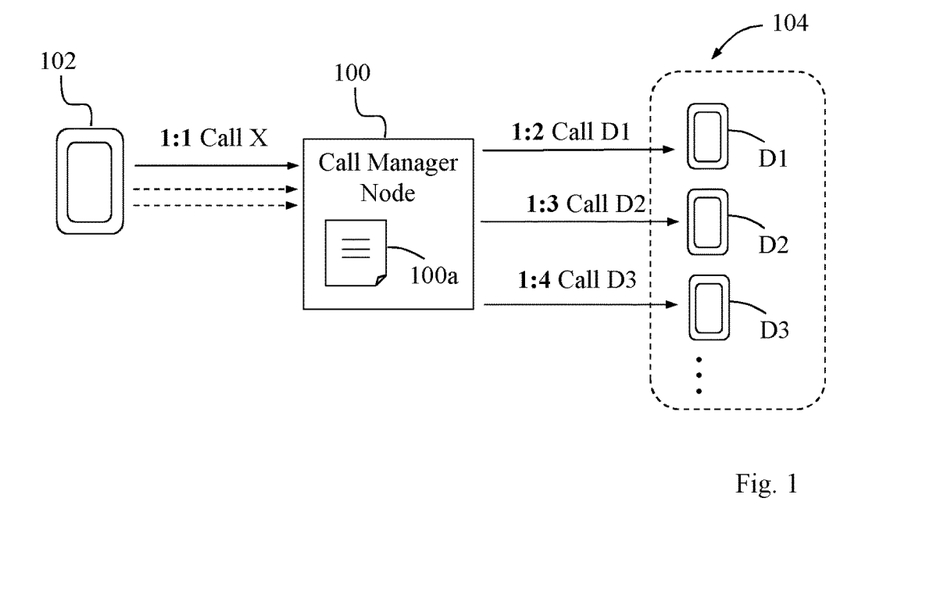
FIG. 1 is a communication scenario illustrating how a group of subscribers can be accessed by means of a single group number X, where the solution described herein can be used.

FIG. 1 illustrates a communication scenario where a single common group number "X" is used for accessing multiple subscribers in a group, involving a call manager node 100, a caller 102 and a plurality of subscribers D1, D2, D3 . . . which form a group of subscribers 104 which can be accessed when dialing the common group number, as follows. Currently, the feature of common group number is limited to scenarios involving a Private Branch Exchange, PBX, of a local enterprise or the like. A first action 1:1 illustrates that the caller 102 dials the group number X and is thereby connected to the call manager node 100. The individual phone numbers of the subscribers D1, D2, D3 . . . are maintained in a list 100a or the like being stored in the call manager node 100, which list is typically static and not changed. Further, the group number X can typically be called by any caller to activate the above-described group calling feature.

When receiving the call to number X from caller 102 for the first time, the call manager node 100 will check the list 100a and initially route the call to the first subscriber D1 on the list, in an action 1:2. If subscriber D1 does not answer, the call is routed to the next subscriber D2 on the list. On the other hand, if the first subscriber D1 answers the call and the call with D1 is completed, the caller 102 may at some point again dial number X a second time. When receiving the second call, the call manager node 100 checks the list 100a and routes the call to the next subscriber D2 on the list, in action 1:3. The dashed arrows in the figure indicate that the caller 102 may dial the number X several times, and each time caller 102 will be connected to the next subscriber in the list 100a. Thus, if another call is received from caller 102, the call manager node 100 will accordingly route the call to the next subscriber D3 on the list, in another shown action 1:4, and so forth.

Further, whenever another caller dials the number X he/she will be connected to subscribers D1, D2 However, the privacy and integrity of the subscribers of a calling group need to be protected and the current solutions for group calling are deemed unsatisfactory in this respect. For example, it is possible for any number of callers to use the common group number without restrictions and the subscribers in the group may receive calls from any callers in this way which could be compromising to the subscribers' privacy and/or integrity.

Briefly described, a solution is provided to protect the privacy and integrity of the subscribers of a calling group, herein denoted subscriber group, such that they can be accessed by means of a caller-specific group number which has been assigned for the caller, not to be available to any other callers. Thereby, the caller-specific group number can be used exclusively by that caller only for calling the subscribers in the group. The caller-specific group number thus associates this particular caller to the subscriber group and it can be seen as a "one-time" disposable number that is valid only for this caller under certain restrictions. For example, certain rules may have been defined that control usage of the caller-specific group number which will be described in more detail later below.

The solution and its embodiments described herein can be implemented in a server or the like which will be referred to as a "call manager node", although other terms are also possible to use, e.g. "group call manager", "subscriber group server", "cloud platform", to mention a few possible alternatives. The call manager node described herein may thus be implemented in a cloud environment, e.g. distributed over multiple physical and/or logical nodes. Further, the term "subscriber group" may be substituted by the term "call target group" throughout this description.

This solution will be briefly outlined first with reference to the signaling diagram in FIG. 2 involving a call manager node 200, a caller 202 and a group of subscribers 204 which are using communication devices D1, D2, D3 . . . , and these devices will represent the subscribers for simplicity in the following description.

In this example, it is assumed that the group of subscribers 204 has already been defined and registered in the call manager node 200 wherein the subscribers have at least one characteristic in common which may relate to more or less static specifics such as residence address, gender, age, birth date, profession and/or income, to mention a few illustrative but non-limiting examples. The common characteristics of a subscriber group may also relate to more dynamically changing specifics of the respective subscribers such as current location, current mood, etc. It follows that the group composition may change over time whenever such dynamic characteristics change for the individual subscribers, to be described further below. It is also possible that the subscriber group is defined upon request from a party that wishes to access subscribers having certain characteristics by means of a common group number. In this description the term "group creator" is used to denote a party, e.g. the future caller, that defines a subscriber group.

Figure 2:
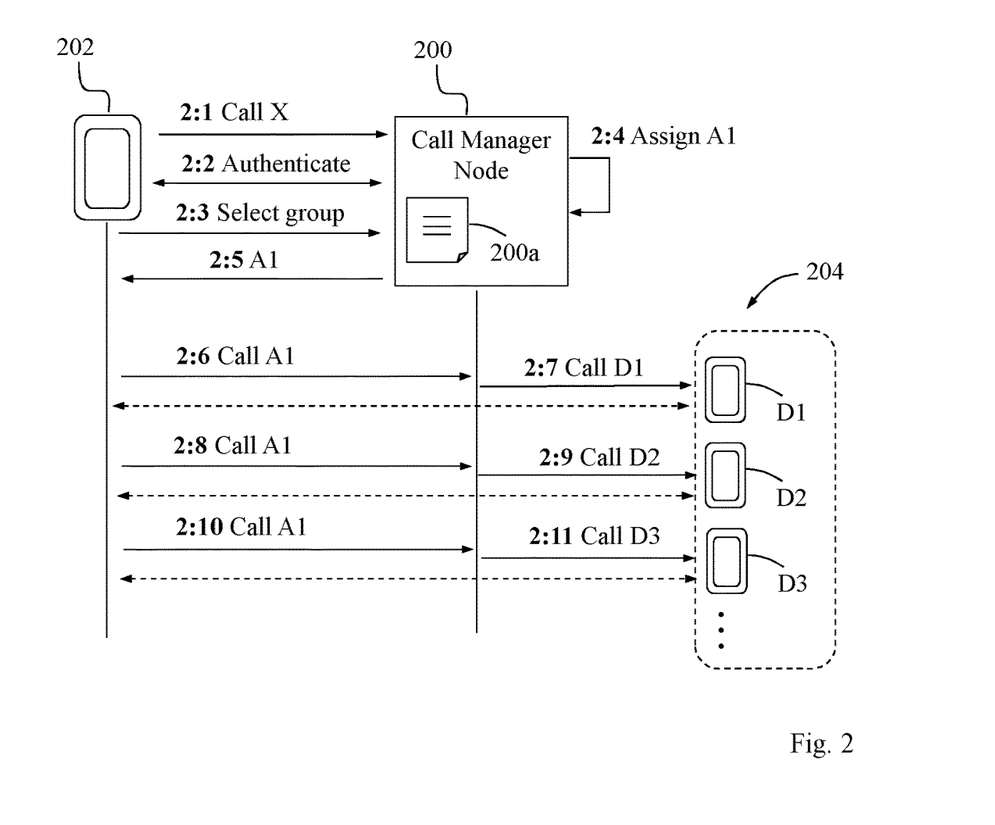
FIG. 2 is a communication scenario illustrating how a group of subscribers can be accessed by means of a caller-specific group number A1, according to some possible embodiments.

In FIG. 2, a first action 2:1 illustrates that the caller 202 calls the call manager node 200 by dialing a number "X" which is a public number that can be used to access the call manager node 200. It should be noted that the number "X" may be an address, such as a Uniform Resource Identifier (URI), instead of a series of numbers. As an example, X may be a public number of the call manager node 200 which can be used by a caller to initiate the procedure as follows. Alternatively, number X may even refer to the subscriber group 204 itself, depending on the implementation. In a next action 2:2, the caller 202 is authenticated, e.g. by using some predefined authentication procedure that may involve a user identity and an associated password or any other suitable security parameter(s). The authentication procedure as such is somewhat outside the scope of this solution and it is assumed that the caller can be properly authenticated by the call manager node 200 in a reliable way.

Another action 2:3 illustrates that the caller 202 selects the group of subscribers 204, e.g. from a set of subscriber groups which may be suggested by the call manager node 200 and presented as selectable alternatives to the caller 202 after successful authentication. Having received the selection of group 204 from the caller 202, the call manager node 200 then assigns a caller-specific group number "A1", which may be a series of numbers or an address such as a URI, for the caller 202, in another action 2:4, wherein the group number A1 can only be used exclusively by the caller 202 as a common number for calling the subscribers in the group 204. The number A1 thus uniquely associates the caller 202 to the subscriber group 204. In this action, the call manager node 200 may also set certain rules for usage of the number A1, e.g. based on preferences of the subscribers in the group. Some examples of such rules will be described later below. In a further action 2:5, the call manager node 200 sends the assigned group number A1 to the caller 202.

At some point later, the caller 202 dials the group number A1 in an action 2:6 and the call manager node 200 checks the above-mentioned association and connects the call to a first subscriber D1 in the group 204, as shown in another action 2:7. In this action, the call manager node 200 may also make sure that any rules that have been defined and set for the number A1 are followed. Thereby, caller 202 is able to conduct a communication with subscriber D1 without having to look up the telephone number or similar of the subscriber D1.

Later on, the caller 202 dials the group number A1 once again in an action 2:8 and the call manager node 200 connects the next call to a second subscriber D2 in the group 204, as shown in another action 2:9. Actions 2:10 and 2:11 illustrate that the caller 202 is connected to a third subscriber D3 when the caller 202 dials the group number A1 a third time, and so forth. It should be noted that if a called subscriber does not answer in this process, the call manager node 200 may automatically attempt to connect the caller 202 to another subscriber in the group 204 according to some predefined calling scheme and depending on the implementation.

Thus, the procedure in FIG. 2 differs from the procedure in FIG. 1 at least by the actions of assigning the caller-specific group number A1 exclusively for the caller 202 and sending the number A1 to the caller 202 in response to calling the number X and selecting group 204 which can be seen as a request for access to the group of subscribers 204.

An example of how the solution may be employed will now be described with reference to the flow chart in FIG. 3 which illustrates a procedure with actions performed by a call manager node which could be the call manager node 200 described above. The call manager node is operative to handle calls directed to a group of subscribers.

A first action 300 illustrates that the call manager node receives a request from a caller for access to a first group of subscribers having at least one common characteristic, e.g. including static and/or dynamic characteristics. Some examples of such characteristics that may be common in a subscriber group have been given above. In a further action 302, the call manager node assigns a first caller-specific group number for the caller, e.g. the number A1 in FIG. 2, wherein the first group number can be used exclusively by the caller for calling the subscribers in the first group. In this context, "exclusively" implies that the first group number can be used only by this particular caller and no-one else for calling the first group of subscribers, and the first group number can thus be seen as a one-time number in the sense that it can be used by only one authorized caller, or by a few authorized callers, e.g. under certain restrictions and rules to be described below. The embodiments described herein may thus also be applied so that the caller-specific group number can be used exclusively by just one caller or by a limited number of callers each being authorized to use it.

Another action 304 illustrates that the call manager node sends the first group number to the caller in response to the request. In a possible embodiment, the call manager node may authenticate the caller before assigning and sending the first caller-specific group number to the caller, e.g. as described for action 2:2 above. It can thus be assumed that this caller is exclusively authorized to access the subscribers in the first group by means of the first caller-specific group number.

A final shown action 306 illustrates that the call manager node connects the caller to a subscriber in the first group iteratively each time the caller dials the first group number. In this context, "iteratively" implies that each time the caller dials the first group number the call manager node connects the caller to one subscriber at a time, e.g. according to some predefined scheme or randomly. For example, the subscribers in the group may be listed or arranged in a certain order that can be iterated in the process of action 306, e.g. according to a priority rating or depending on their respective characteristics such as their current location, residence address, age or birth date.

It is an advantage of this solution that the first group number cannot be used by any other party than the caller that is authorized to use it, which provides for high security. Another advantage is that the individual numbers of the subscribers in the first group of subscribers are not exposed to the caller in this process which provides for high integrity. Another advantage is that any rules or restrictions may be set to control the caller's usage of the first caller-specific group number, e.g. according to preferences of the individual subscribers in the first group.

Several optional embodiments of this procedure are possible and some examples will now be described. It was indicated above that certain rules may be defined and set to control the caller's usage of the caller-specific group number. In a possible embodiment, such rules or similar may dictate that the caller can be connected only a limited number of times to each subscriber in the first group. In one example, the caller may be allowed to access each subscriber only once such that the first group number is successively consumed for each connected subscriber. In another example, one or more of the subscribers in the group may have defined certain access rules, e.g. dictating that the respective subscriber can be accessed only once or other limited number of times, or at a certain time of day or week.

In another possible embodiment, the rules or similar may dictate that the first group number can only be used by the caller during a pre-set time period, e.g. such that the first group number will expire after a certain duration and/or at a certain point in time. In a further possible embodiment, the caller may be connected iteratively to the subscribers in the first group according to a predefined calling scheme, which has been explained above. Another embodiment may be that if a connected subscriber in the calling scheme does not respond the caller is connected to a next subscriber in the calling scheme.

In further possible embodiments, the calling scheme may comprise a calling policy, i.e. basically the above-mentioned rules, dictating at least one of:
  when, i.e. at what time, the subscribers in the first group can be accessed by the caller, and
  how many times the subscribers in the first group can be accessed by the caller.

The above-described embodiments are examples of how the access to the subscribers in the group can be controlled by setting various rules or policies.

In still further possible embodiments, the call manager node may suggest a set of predefined groups of subscribers to the caller, e.g. after the caller has dialed a public number of the call manager node, and in that case the request in action 300 may indicate that the first group of subscribers has been selected from the set by the caller. Several different groups of subscribers may thus have been predefined in beforehand in the call manager node based on different common characteristics of the individual subscribers. Such groups may be predefined by a future caller or other party, generally referred to as the group creator. For example, one subscriber group may have been defined to comprise subscribers with residential address within a specific living area, or having a certain age range and currently being within a certain location area. Subscribers having a certain combination of several characteristics may also be included in a predefined subscriber group, e.g. subscribers with a certain combination of income, age and profession category.

In yet a possible embodiment, the call manager node may select the set of predefined groups of subscribers to suggest to the caller, based on characteristics of the caller. It may thus be sensible or appropriate to suggest predefined groups of subscribers that in some respect match the characteristics of the caller and therefore should be of interest to the caller in some respect. For example, a sales person that sells expensive luxury cars may be suggested a group of subscribers of a certain age and having a certain income and/or profession. In another example, a person that runs a private school may be suggested a group of subscribers living in a certain area and having children of a certain age. In another possible embodiment, the call manager node may obtain the characteristics of the caller based on a social graph analysis of the caller, e.g. using methods which are well-known in the art and therefore not necessary to describe here in any detail.

It was further mentioned above that a subscriber group may be defined upon request from the caller wishing to access subscribers having certain characteristics by means of a common group number. In this case the caller may define conditions for inclusion in the group in the form of attributes as follows. In another possible embodiment, the request received from the caller in action 300 may thus comprise a set of attributes, and in that case the call manager node may create or select the first group of subscribers to include subscribers matching the set of attributes in the request. In yet a possible embodiment, the set of attributes may relate to at least one of: residence address, gender, age, birth date, profession, income, current location, interests, preferences, recent purchases, current mood, device characteristics and call history.

It may also be possible to add new subscribers to an existing subscriber group, and/or to remove subscribers therefrom as well, particularly if any of the common characteristics is dynamic. Thus in another possible embodiment, the call manager node may add a new subscriber to the first group of subscribers when receiving a registration request from the new subscriber, or when detecting that the new subscriber matches the at least one common characteristic of the first group of subscribers. In another possible embodiment, the call manager node may remove a subscriber from the first group of subscribers in response to receiving a de-registration request from the subscriber or when detecting that the subscriber has ceased to match the at least one common characteristic of the first group of subscribers. For example, if the group is defined based on a current location of its subscribers as being a dynamic common characteristic, any subscriber that moves into a certain area may be added to the first group, and conversely any subscriber that moves out from that area may be removed from the first group.

In another possible embodiment, the call manager node may copy information of a subscriber from the first group to a second group of subscribers in response to receiving an indication of approval from the subscriber. This embodiment means that a second group of subscribers may be formed as a subset of the first group comprising subscribers that have in some way indicated approval that they are willing to be contacted by the caller once again in the future. In this embodiment the term "indication of approval" basically implies that a subscriber is willing to be contacted by the caller once again, thereby qualifying for inclusion in the second group. For example, the subscriber may submit a specific password or the like as an indication of approval to the call manager node.

According to this embodiment, the subscriber may be either accepting an offer or the like from the caller, sometimes referred to as a "sales pitch", or may be "tentative" in the sense of not having decided yet. This embodiment further allows for a third group of subscribers to be formed containing any tentative subscribers if the second group contains the outright positive subscribers having accepted the offer, and the solution is not limited in this respect.

For example, a salesman may in a sales activity offer some product or service to a called subscriber and that subscriber may indicate interest to possibly purchase that product or service, or at least not definitely rejecting the offer. In that case, the caller may want to follow up the sales activity by calling the interested subscriber once again. Therefore, any subscribers indicating approval can be gathered in the second group of subscribers so that the caller may obtain a second caller-specific group number to gain access to the subscribers in the second group.

Thus in another possible embodiment, the call manager node may assign and send a second caller-specific group number to the caller, wherein the second group number can be used exclusively by the caller for calling the subscribers in the second group. It should be noted that the individual numbers of the subscribers in the second group are still not exposed to the caller at this stage which provides for high integrity. A more detailed example of a procedure performed by a call manager node when at least the latter two embodiments are employed, will now be described with reference to the flow chart in FIG. 4.

Figure 4:
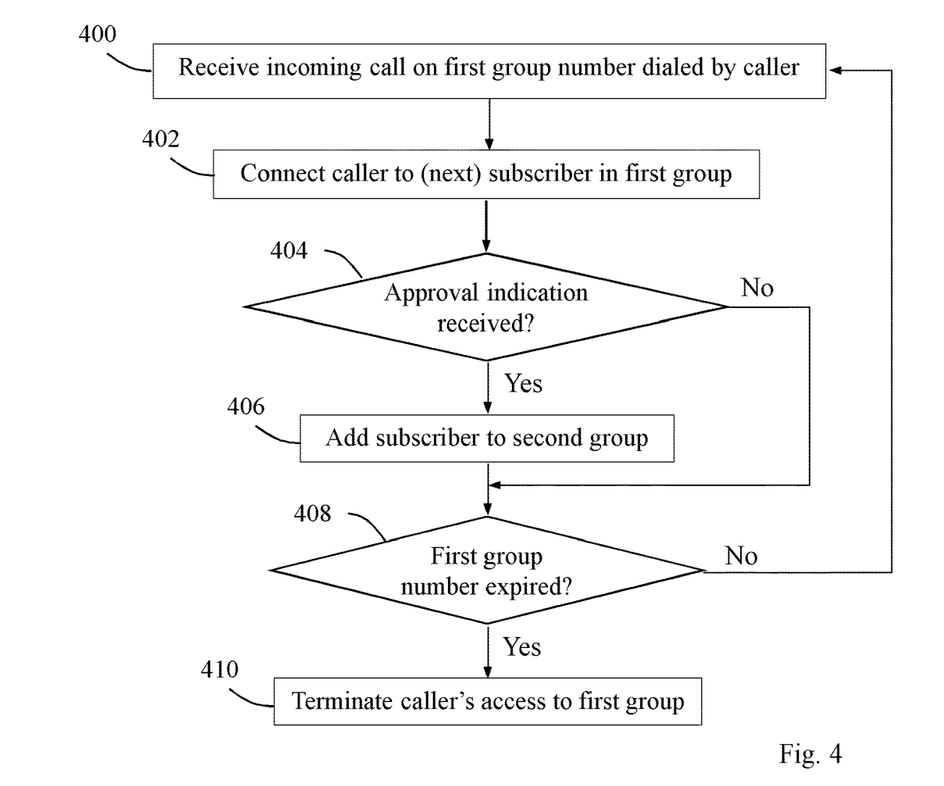
FIG. 4 is another flow chart illustrating a procedure in a call manager node for managing a second group of subscribers, according to further possible embodiments.

In this example it is assumed that a caller has already received a first caller-specific group number from the call manager node that can be used for accessing subscribers in a first group of subscribers having at least one common characteristic. In a first action 400, the call manager node receives an incoming call on the first caller-specific group number from the caller, basically corresponding to any of actions 2:6, 2:8 and 2:10 above. The call manager node then connects the caller to a (next) subscriber in the first group of subscribers, in another action 402, e.g. after checking and complying with any rules or policy that have been set for the caller-specific group number as described above.

A further action 404 illustrates that the call manager node determines whether any indication of approval has been received from the called subscriber, in the sense described above, thus implying either accepting or tentative but not rejecting. If so, the call manager node adds the currently called subscriber to a second group of subscribers by copying information of that subscriber from the first group to the second group of subscribers, in an action 406. On the other hand if no indication of approval has been received from the called subscriber, action 406 is skipped.

A further action 408 illustrates that the call manager node determines whether the first caller-specific group number has expired or not, e.g. by checking the above-mentioned rules or policy. It was mentioned above that the first group number may be set to expire after a certain duration and/or at a certain point in time, and that a calling policy or the like may dictate how many times the subscribers in the first group can be accessed by the caller. If the first caller-specific group number has expired in action 408, the call manager node terminates the caller's access to the first subscriber group in another action 410. If the first caller-specific group number has not expired in action 408, the process may be repeated by moving to action 400 whenever the caller dials the first caller-specific group number again.

In this way, the second group of subscribers having providing an indication of approval can be accumulated by adding subscribers from the first group to the second group as of action 406. Further, the call manager node may assign and send a second caller-specific group number to the caller, which can be used exclusively by the caller for calling the subscribers accumulated in the second group, as described above.

Figure 5:
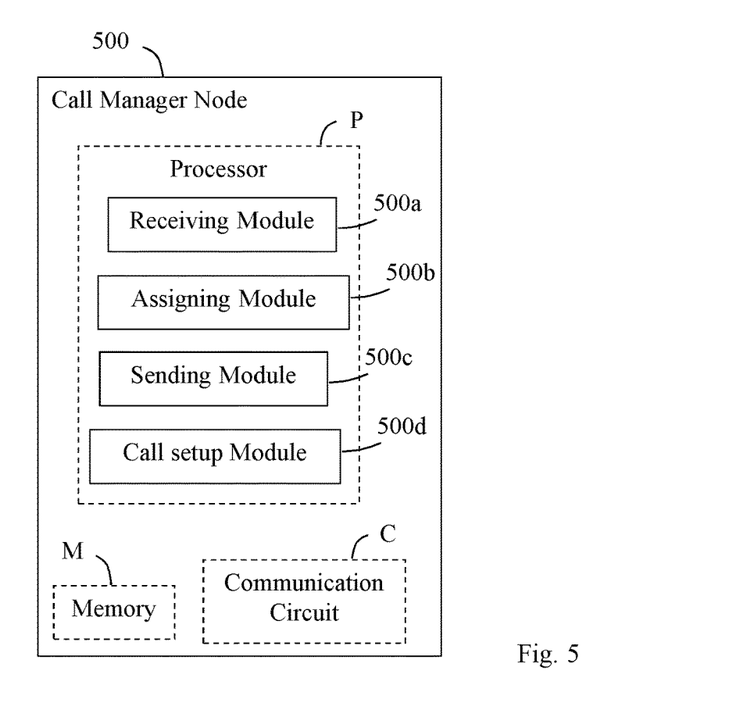
FIG. 5 is a block diagram illustrating a call manager node in more detail, according to further possible embodiments.

The block diagram in FIG. 5 illustrates a detailed but non-limiting example of how a call manager node 500 may be structured to bring about the above-described solution and embodiments thereof. In this figure, the call manager node 500 may thus be configured to operate according to any of the examples and embodiments of employing the solution as described above, where appropriate, and as follows.

The call manager node 500 is shown to comprise a processor "P", a memory "M" and a communication circuit "C" with suitable equipment for transmitting and receiving signals with data and messages in the manner described herein.

The communication circuit C in the call manager node 500 thus comprises equipment configured for communication with a caller and various subscribers, not shown, using one or more suitable communication protocols depending on implementation. As in the examples discussed above, the call manager node 500 described herein may be a central server or a cloud-based node that may be distributed over several physical and/or logical nodes. The call manager node 500 comprises means configured or arranged to perform at least some of the actions 300-306 and 400-410 of the flow charts in FIGS. 3 and 4, respectively, in the manner described above. These actions may be performed by means of functional modules in the processor P in the call manager node 500 as follows.

The call manager node 500 is arranged to handle calls directed to a group of subscribers. The call manager node 500 thus comprises a processor P and a memory M, said memory comprising instructions executable by said processor, whereby:

The call manager node 500 is operative to receive a request from a caller for access to a first group of subscribers having at least one common characteristic. This receiving activity may be performed by a receiving module 500a in the call manager node 500, e.g. in the manner described for action 300 above.

The call manager node 500 is also operative to assign a first caller-specific group number for the caller, wherein the first group number can be used exclusively by the caller for calling the subscribers in the first group. This assigning activity may be performed by an assigning module 500b in the call manager node 500, e.g. in the manner described for action 302 above.

The call manager node 500 is also operative to send the first group number to the caller in response to the request. This sending activity may be performed by a sending module 500c in the call manager node 500, e.g. in the manner described for action 304 above. The call manager node 500 is also operative to connect the caller to a subscriber in the first group iteratively each time the caller dials the first group number. This connecting activity may be performed by a call setup module 500d in the call manager node 500, e.g. in the manner described for action 306 above.

It should be noted that FIG. 5 illustrates some possible functional modules in the call manager node 500 and the skilled person is able to implement these functional modules in practice using suitable software and hardware. Thus, the solution is generally not limited to the shown structures of the call manager node 500, and the functional modules 500a-d may be configured to operate according to any of the features described in this disclosure, where appropriate.

Figure 3:
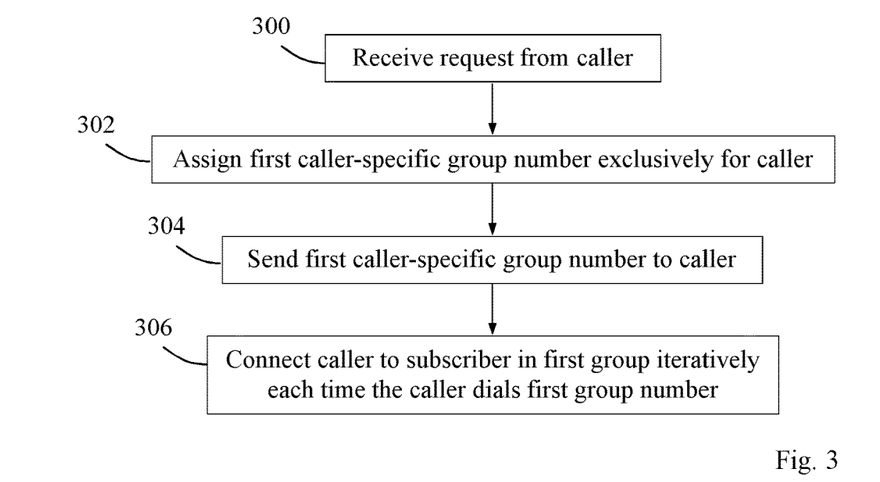
FIG. 3 is a flow chart illustrating a procedure in a call manager node for providing access to a first group of subscribers, according to further possible embodiments.

The embodiments and features described herein may thus be implemented in a computer program comprising instructions which, when executed on at least one processor, cause the at least one processor to carry out the above actions e.g. as described for any of FIGS. 3 and 4. Further, the above-described embodiments may be implemented in a carrier containing the above computer program, wherein the carrier is one of an electronic signal, optical signal, radio signal, or computer readable storage medium. The computer readable storage medium may be a compact disc or other carrier suitable for holding the computer program. Some examples of how the computer program and the carrier can be realized in practice are outlined below, and with further reference to FIG. 5.

The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The memory M may comprise the above-mentioned computer readable storage medium or carrier on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM). The program modules could in alternative embodiments be distributed on different computer program products in the form of memories within the call manager node 500.

Figure 6:
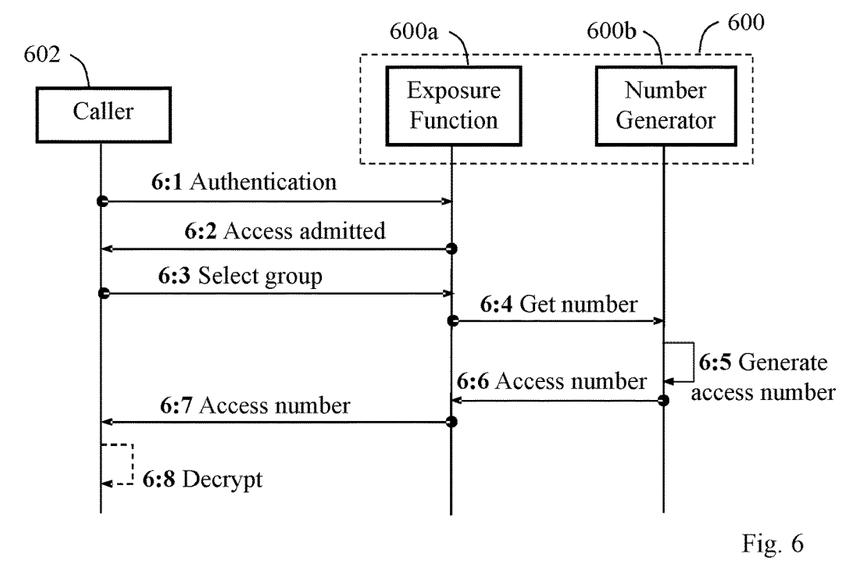
FIG. 6 is a signaling diagram illustrating an example of a procedure for providing a caller-specific group number, according to further possible embodiments.

It will now be described with reference to the signalling diagram in FIG. 6 how a caller 602 may obtain a caller-specific group number from a call manager node 600 for gaining access to a subscriber group in the manner described above. In this example, the call manager node 600 is shown to comprise an exposure function 600a used for communicating with callers, and a number generator 600b used for generating caller-specific group numbers. The call manager node 600 may be the call manager node in any of the examples described above.

A first shown action 6:1 illustrates schematically that the caller 602 is authenticated towards the exposure function 600a in the call manager node 600, e.g. using any regular authentication method not necessary to describe here. In a further action 6:2, the exposure function 600a notifies the caller 602 that access is admitted for obtaining a caller-specific group number for a subscriber group.

Another action 6:3 illustrates that the caller 602 selects a subscriber group for which access is requested, e.g. selected from a set of subscriber groups offered by the exposure function 600a in the call manager node 600, each subscriber group having at least one common characteristic. It has been described above how the call manager node may offer different subscriber groups to the caller for selection, and also that the call manager node may alternatively create or select the first group of subscribers to include subscribers matching a set of attributes comprised in a request from the caller. This action thus basically corresponds to the action 300 above where the call manager node receives a request from a caller for access to a first group of subscribers having at least one common characteristic.

In a further action 6:4, the exposure function 600a basically requests a caller-specific group number from the number generator 600b, which number thus constitutes an association between the caller 602 and the requested subscriber group. A set of rules may also be valid for the group number, as said above. An action 6:5 illustrates that the number generator 600*b* generates the caller-specific group number, denoted access number for short, for the caller 602, and action 6:6 illustrates that the number generator 600*b* provides the access number to the exposure function 600*a*. In a further action 6:4, the exposure function 600*a* may first encrypt the access number which is then sent to the caller 602 in another action 6:7. If encrypted, the caller 602 decrypts the access number in a final shown action 6:8.

Figure 7:
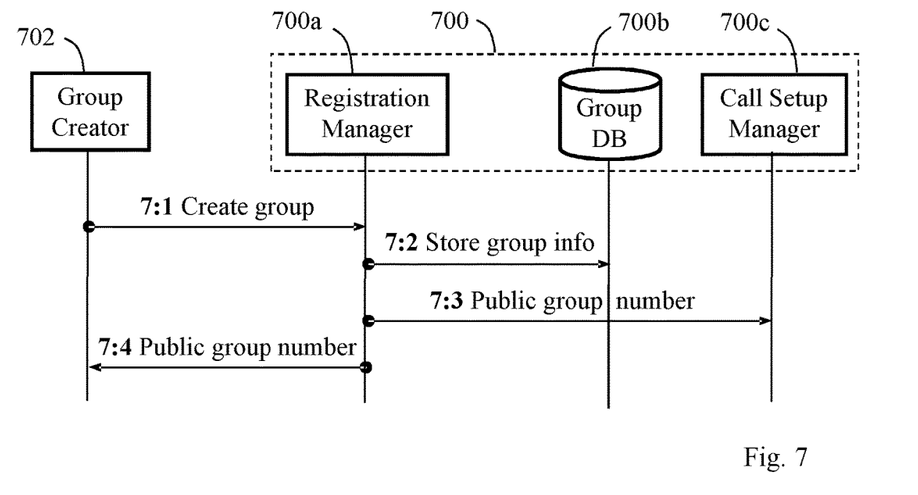
FIG. 7 is a signaling diagram illustrating an example of a procedure for establishing a group of subscribers, according to further possible embodiments.

It will now be described with reference to the signalling diagram in FIG. 7 how a subscriber group may be created by a group creator 702 and registered in a call manager node 700 which may be the call manager node in any of the examples described above. In this example, the call manager node 700 is shown to comprise a registration manager 700*a* used for registering new subscriber groups, a group database 700*b* in which information about the subscriber groups is maintained, and a call setup manager 700*c* used for setting up connections between a caller and the subscribers in the group whenever the caller dials a corresponding caller-specific group number. An example of the actual call setup procedure will be described later below. The call setup manager 700*c* may be comprised in a network operator's core network.

A first shown action 7:1 illustrates schematically that the group creator 702 sends a request to the registration manager 700*a*, basically requesting that a subscriber group is created and registered in the call manager node 700. The group creator 702 may be a future caller or any other party that is used for creating the subscriber group. In another action 7:2, the registration manager 700*a* stores information about the subscriber group in the group database 700*b*, such as identities of its subscribers and any rules, policies or restrictions for accessing the group and for usage of a corresponding caller-specific group number.

A further action 7:3 illustrates schematically that the registration manager 700*a* registers a public accessible number for the subscriber group in the call setup manager 700*c*. The public accessible number may be published by the group creator 702 and used later by a potential caller to request for a caller-specific group number for access to that subscriber group, e.g. according to the procedure in FIG. 6. A final shown action 7:4 illustrates that the registration manager 700*a* returns the public accessible number to the group creator 702.

Figure 8:
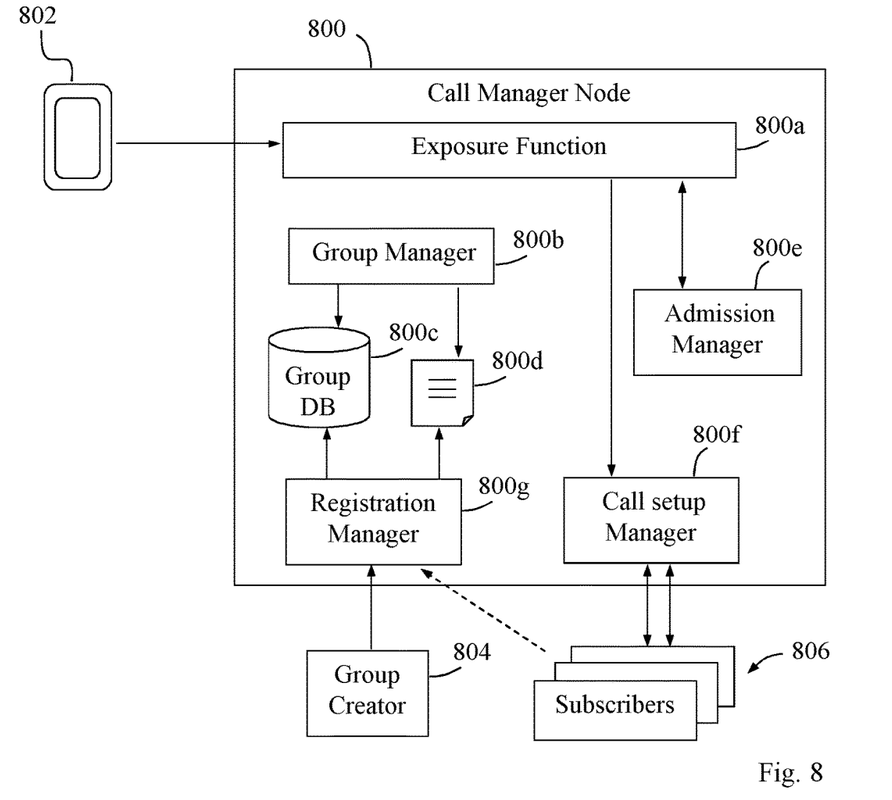
FIG. 8 is a block diagram illustrating an example of how a call manager node may be implemented in practice, according to further possible embodiments.

An example of how a call manager node may be implemented in practice will now be described with reference to the block diagram in FIG. 8. The call manager node 800 is shown to comprise the following components of functional entities:

Exposure function 800*a*: This is a function that exposes information and messages to callers, e.g. the shown caller 802. It exposes an Application Programming Interface, API, to callers to query the call manager node for subscriber groups based on attributes comprised in the request, e.g. current locations or interests. This function corresponds to the exposure function 600*a* in FIG. 6.

Group Manager 800*b*: This is a function that orchestrates the registration of subscriber groups and their subscribers and handles the requests for access to subscriber groups by prospective callers. It also removes and omits the subscriber identification as a part of a call initiated by the caller.

Group database 800*c*: This is the database where all information about the subscriber groups and their subscribers is stored. This information may include a) contact information of each member, e.g. mobile, fixed number or SIP URI, b) contact information about the subscriber groups, e.g. a phone number or a SIP URI, c) a list of attributes identifying the CTG member, e.g. location, interests, etc., and d) a subscriber group specification, e.g. a polygon with vertices defined by GPS coordinates or the like. This database corresponds to the group database 700*a* in FIG. 7.

Subscriber group strategy 800*d*: This function maintains and enforces any rules for strategy of contact for the subscribers in each group, e.g. dictating if the numbers are accessed one by one, if some numbers have preferences regarding time of day when calling is allowed, etc.

Admission manager 800*e*: This function checks if a particular caller is allowed to call a subscriber group. Moreover, the same function is responsible for keeping track of any information related to how many times that caller can access this group, which time of the day etc.

Call setup manager 800*f*: This is a function that sets up connections, i.e. calls, to subscribers of a selected subscriber group. This function may be realized e.g. by an operator of an IMS system, Skype, Viber, etc. This function corresponds to the call setup manager 700*c* in FIG. 7.

Registration Manager 800*g*: This is a function that handles registrations of subscriber groups, e.g. as requested by a group creator 804. This function also handles registrations of individual subscribers 806 that express interest to be part of a subscriber group. This function also handles the collection of subscriber information or forwarding queries to other sources of subscriber information e.g. to a mobile operator subscriber group platform. This function corresponds to the registration manager 700*a* in FIG. 7.

Figure 9:
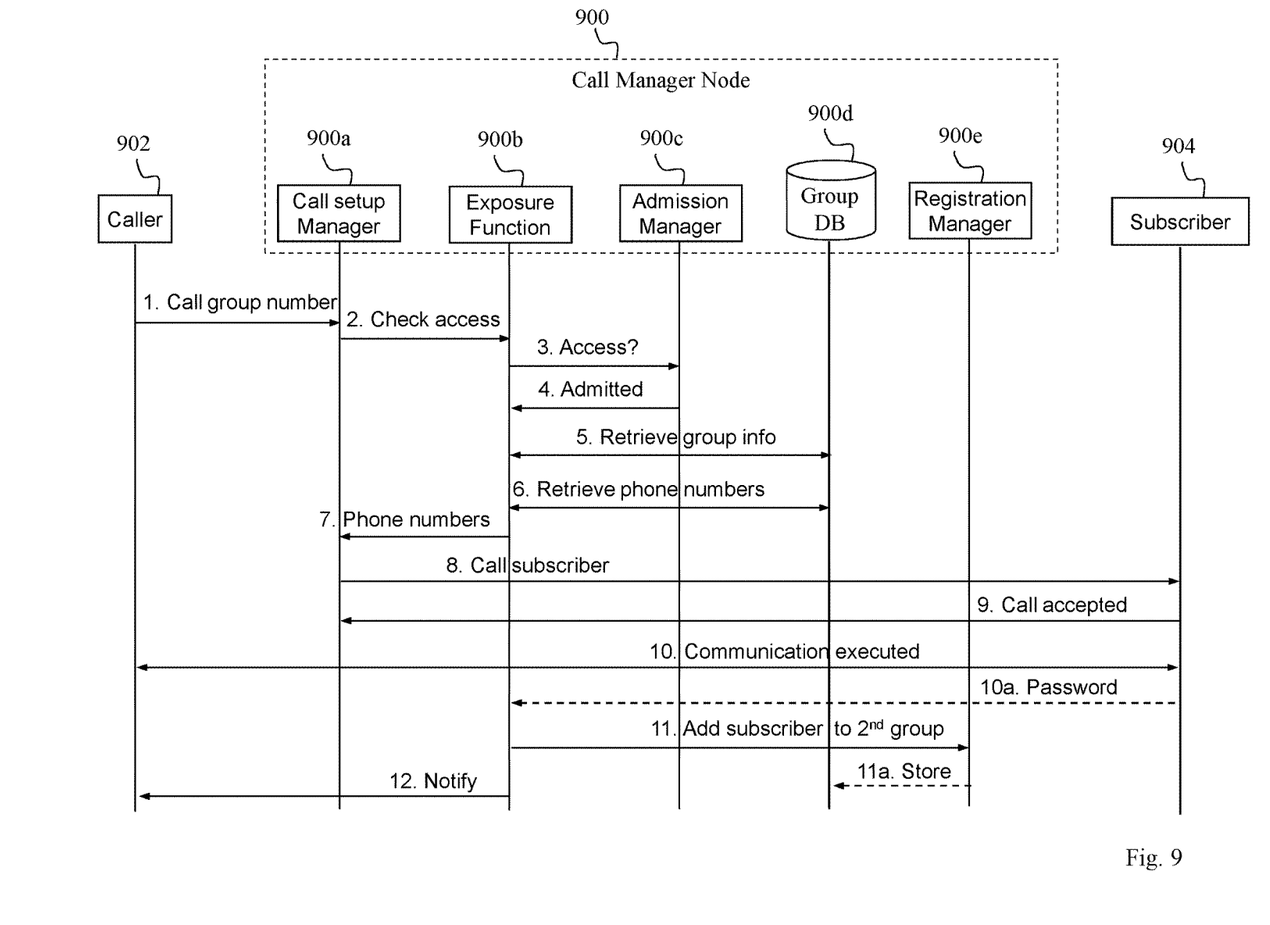
FIG. 9 is a signaling diagram illustrating an example involving a call-setup procedure, according to further possible embodiments.

With reference to the signaling diagram in FIG. 9, a detailed example will now be described of how a call manger node 900 may conduct a call setup for a caller 902 having obtained a caller-specific group number for access to a subscriber group, as represented by a shown subscriber 904. It is assumed that the subscriber group is defined by a group specification comprising at least one common characteristic. The call manger node 900 comprises basically the same functional entities as shown in FIG. 8. In this process, steps 1-12 are performed as follows:

Step 1: The caller 902 calls the call setup manager 900*a* in the call manger node 900, e.g. in operator's core network, with the caller-specific group number of the subscriber group. In an 3GPP-IMS network, this may be done by means of a SIP INVITE message sent in this step from the caller 902 to the call setup manager 900*a*.

Step 2, The call setup manager 900*a* checks if the caller 902 is allowed to use that number to access subscribers in the group. This may be done by "proxying" the incoming call to the admission manager 900*c* via the exposure function 900*b* as of the next step.

Step 3: The exposure function 900*b* asks the admission manager 900*c* if the caller is allowed to use that number to access the subscriber group.

Step 4: The admission manager 900*c* notifies the exposure function 900*b* that the caller 902 can be admitted access to the subscriber group, e.g. according to rules set for the caller-specific group number. The access policy in admission manager 900*c* may also be updated e.g. if the access policy dictates how many times the caller 902 can use this number. In that case, the corresponding access counter is increased by 1.

Step 5: The exposure function 900*b* then retrieves information about this subscriber group from the group database 900*d*, e.g. including information about users that fulfill the group specification.

Step 6: The exposure function 900b also retrieves the subscribers' phone numbers from the group database 900d. If some of the needed information is not available in the group database 900d, for example the subscribers' current location, the exposure function 900b may also retrieve such information from some external database such as the operator's location database, not shown.

Step 7: The exposure function 900b then aggregates the retrieved information and return a phone number list of the subscribers in the group and the access policy to the call setup manager 900a.

Step 8-Step 10: The call setup manager 900a hunts one or several targeted subscribers, e.g. according to a calling scheme, and once one of them accepts the call, then caller 902 is connected to the targeted subscriber 904 to conduct a call. In this process, a communication session is thus established and the caller 902 and subscriber 904 may communicate with each other using a particular codec.

Step 10a: The subscriber 904 may submit a specific password to the exposure function 900b, e.g. in the form of a DTMF code, as an indication of approval of the caller, which has been described above. This may be useful for example in a scenario where the subscriber 904 has accepted a sales pitch or the like and would like to proceed to a secondary phase where he/she can discuss more details about the sales with the caller, still without having revealed his/her true identity.

Step 11: The subscriber 904 is added to a subsidiary subscriber group i.e. the above-described second group of subscribers being a subset of the first group and comprising subscribers that have indicated approval that they are willing to be contacted by the caller 902 once again in the future. Having received the password, the exposure function 900b accordingly asks the registration manager 900e to add the subscriber 904 to the second subscriber group.

Step 11a: The registration manager 900e stores information about the subscriber 904 being added to the second subscriber group.

Step 12: The exposure function 900b notifies the caller 902 about the subscriber 904 being added to the second subscriber group.

Dynamic subscriber groups may be created using a process in the background in parallel to the different functions described in this disclosure. This process may be triggered periodically or on-demand when needed.

The purpose of this process is to identify an association between an event and the addition and/or removal of a subscriber into a group. An example of an event may be adding/removing/updating a record related to a particular user in a database, for instance a new record may be created in a database that user Joe called a florist today at 15:00. This record may be represented as a tuple with the following elements:

schema (User, Address, Age, Interest, Preference), tuple (Joe, 5th Avenue, 35, Purchasing flowers from "Interflora", Red roses).

The creation of this tuple, which may be added as a new record in the database, can be used to trigger an action for including Joe in a subscriber group called "Interflora Customers". This association may be implemented using any off-the-shelf rule engine software that is capable of expressing an action of the type "if-then-that". An example of such a rule may be expressed as:

```
if (new_record_with("flowers from Interflora"))
then
    add_user(username, "Interflora Customers")
```

In order to protect the user's privacy, this rule may not be triggered immediately. Instead, the user Joe will receive a notification about this event and then it is up to him whether or not he wants to be included in this subscriber group or not.

Figure 10:
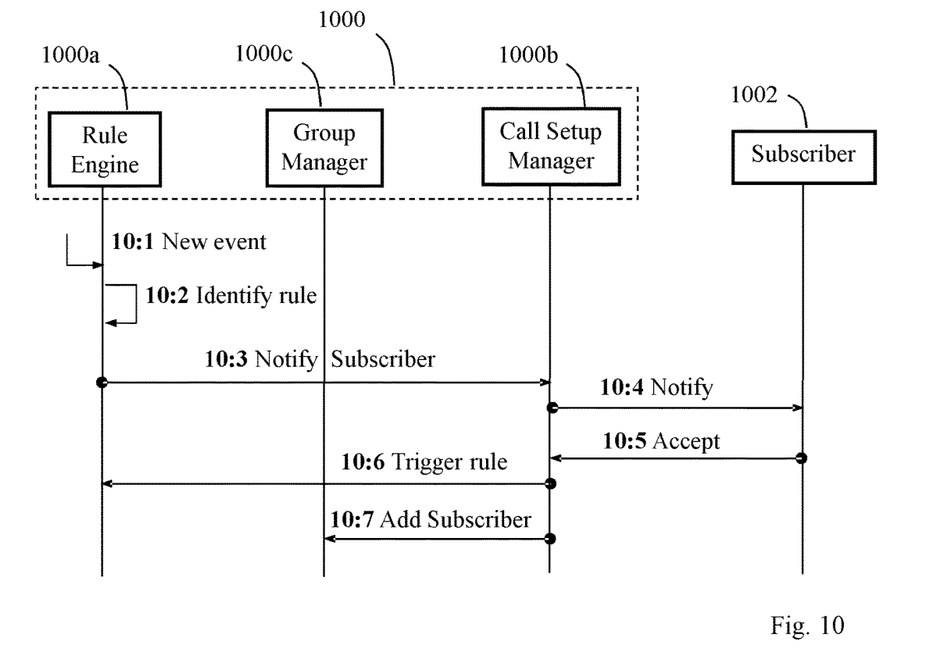
FIG. 10 is a signaling diagram illustrating an example of how a new subscriber can be added to a group of subscribers, according to further possible embodiments.

If the user accepts then he will be added in this group. If the group does not exist yet, e.g. if Joe is the first subscriber, then a new group will be created, which is shown in the signaling diagram in FIG. 10 illustrating an example of how a new subscriber can be added to an existing group of subscribers. This signaling diagram thus shows how a detected event as described previously can lead to the creation of a new group and/or the addition of a subscriber into the group assuming the subscriber permits that interaction. In this example, a call setup manager is used in order to retrieve the user's permission.

First, a rule engine 1000a in a call manager node 1000 detects a new event involving the above-mentioned user Joe illustrated as subscriber 1002, in an action 10:1. The rule engine 1000a then identifies a rule of the existing subscriber group in an action 10:2 which corresponds to the detected action. The rule engine 1000a further asks the call setup manager 1000b to notify the subscriber 1002 in another action 10:3, basically to ask the subscriber 1002 if he wants to be a member of the subscriber group. The call setup manager 1000b then notifies the subscriber 1002, i.e. Joe, accordingly in an action 10:4.

In a next action 10:5, call setup manager 1000b receives a message from subscriber 1002 that indicates that he accepts to be added as a member of the subscriber group. The call setup manager 1000b then triggers the rule in the rule engine, in an action 10:6, and also asks the group manager 1000c to add the subscriber 1002 to the existing subscriber group, as shown in an action 10:7.

While the solution has been described with reference to specific exemplifying embodiments, the description is generally only intended to illustrate the inventive concept and should not be taken as limiting the scope of the solution. For example, the terms "call manager node", "caller", "subscriber", "subscriber group" and "group number" have been used throughout this disclosure, although any other corresponding entities, functions, and/or parameters could also be used having the features and characteristics described here. The solution is defined by the appended claims.

The invention claimed is:

1. A method performed by a call manager node for handling calls directed to multiple subscribers, the method comprising:
   receiving a request from a caller for access to a first group of subscribers having at least one common characteristic,
   assigning a first caller-specific group number for the caller, wherein the first group number can be used exclusively by the caller for calling the subscribers in the first group,
   sending the first group number to the caller in response to the request, and
   connecting the caller to just one subscriber in the first group iteratively each time the caller dials the first group number, wherein the step of connecting the caller to just one subscriber iteratively each time the caller dials the first group number comprises:

determining that the caller has dialed the first group number;

after determining that the caller has dialed the first group number, connecting the caller to only a first subscriber in the first group;

after connecting the caller to only the first subscriber, determining that the caller has again dialed the first group number; and after determining that the caller has again dialed the first group number, connecting the caller to only a second subscriber in the first group, wherein the second subscriber is a different subscriber than the first subscriber.

2. The method of claim 1, wherein the caller can be connected only a limited number of times to each subscriber in the first group.

3. The method of claim 1, wherein the first group number can be used by the caller during a pre-set time period.

4. The method of claim 1, wherein the caller is connected iteratively to the subscribers in the first group according to a predefined calling scheme.

5. The method of claim 4, wherein the calling scheme comprises a calling policy dictating at least one of:
when the subscribers in the first group can be accessed by the caller, and
how many times the subscribers in the first group can be accessed by the caller.

6. The method of claim 1, wherein the call manager node suggests a set of predefined groups of subscribers to the caller and the request indicates that the first group of subscribers has been selected from the set by the caller.

7. The method of claim 6, wherein the call manager node selects the set of predefined groups of subscribers to suggest, based on characteristics of the caller.

8. The method of claim 1, wherein the call manager node adds a new subscriber to the first group of subscribers when receiving a registration request from the new subscriber or when detecting that the new subscriber matches the at least one common characteristic of the first group of subscribers.

9. The method of claim 1, wherein the call manager node removes a subscriber from the first group of subscribers in response to receiving a de-registration request from the subscriber or when detecting that the subscriber has ceased to match the at least one common characteristic of the first group of subscribers.

10. The method of claim 1, wherein the call manager node authenticates the caller before assigning and sending the first caller-specific group number to the caller.

11. The method of claim 1, wherein the call manager node copies information of a subscriber from the first group to a second group of subscribers in response to receiving an indication of approval from the subscriber.

12. A call manager node arranged to handle calls directed to a group of subscribers, the call manager node being configured to:
receive a request from a caller for access to a first group of subscribers having at least one common characteristic;
assign a first caller-specific group number for the caller, wherein the first group number can be used exclusively by the caller for calling the subscribers in the first group;
send the first group number to the caller in response to the request;
connect the caller to just one subscriber in the first group iteratively each time the caller dials the first group number, wherein the call manager node is configured to connect the caller to just one subscriber iteratively each time the caller dials the first group number by performing a process that includes:
determining that the caller has dialed the first group number;
after determining that the caller has dialed the first group number, connecting the caller to only a first subscriber in the first group;
after connecting the caller to only the first subscriber, determining that the caller has again dialed the first group number; and
after determining that the caller has again dialed the first group number, connecting the caller to only a second subscriber in the first group, wherein the second subscriber is a different subscriber than the first subscriber.

13. The call manager node of claim 12, wherein the caller can be connected only a limited number of times to each subscriber in the first group.

14. The call manager node of claim 12, wherein the first group number can be used by the caller during a pre-set time period.

15. The call manager node of claim 12, wherein the caller is connected iteratively to the subscribers in the first group according to a predefined calling scheme.

16. The call manager node of claim 15, wherein the calling scheme comprises a calling policy dictating at least one of:
when the subscribers in the first group can be accessed by the caller, and
how many times the subscribers in the first group can be accessed by the caller.

17. The call manager node of claim 12, wherein the call manager node is configured to suggest a set of predefined groups of subscribers to the caller and the request indicates that the first group of subscribers has been selected from the set by the caller.

18. The call manager node of claim 17, wherein the call manager node is configured to select the set of predefined groups of subscribers to suggest, based on characteristics of the caller.

19. The call manager node of claim 12, wherein the call manager node is configured to add a new subscriber to the first group of subscribers when receiving a registration request from the new subscriber or when detecting that the new subscriber matches the at least one common characteristic of the first group of subscribers.

20. The call manager node of claim 12, wherein the call manager node is configured to remove a subscriber from the first group of subscribers in response to receiving a de-registration request from the subscriber or when detecting that the subscriber has ceased to match the at least one common characteristic of the first group of subscribers.

21. The call manager node of claim 12, wherein the call manager node is configured to authenticate the caller before assigning and sending the first caller-specific group number to the caller.

22. The call manager node of claim 12, wherein the call manager node is configured to copy information of a subscriber from the first group to a second group of subscribers in response to receiving an indication of approval from the subscriber.

23. A computer program product comprising a non-transitory computer readable medium storing a computer program comprising instructions which, when executed on at least one processor, cause the at least one processor to carry out the method of claim 1.

24. The method of claim 1, further comprising:
after determining that the caller has dialed the first group number and before connecting the caller to only a first subscriber in the first group, determining that the caller is authorized to use the first group number.

\* \* \* \* \*